UNITED STATES PATENT OFFICE.

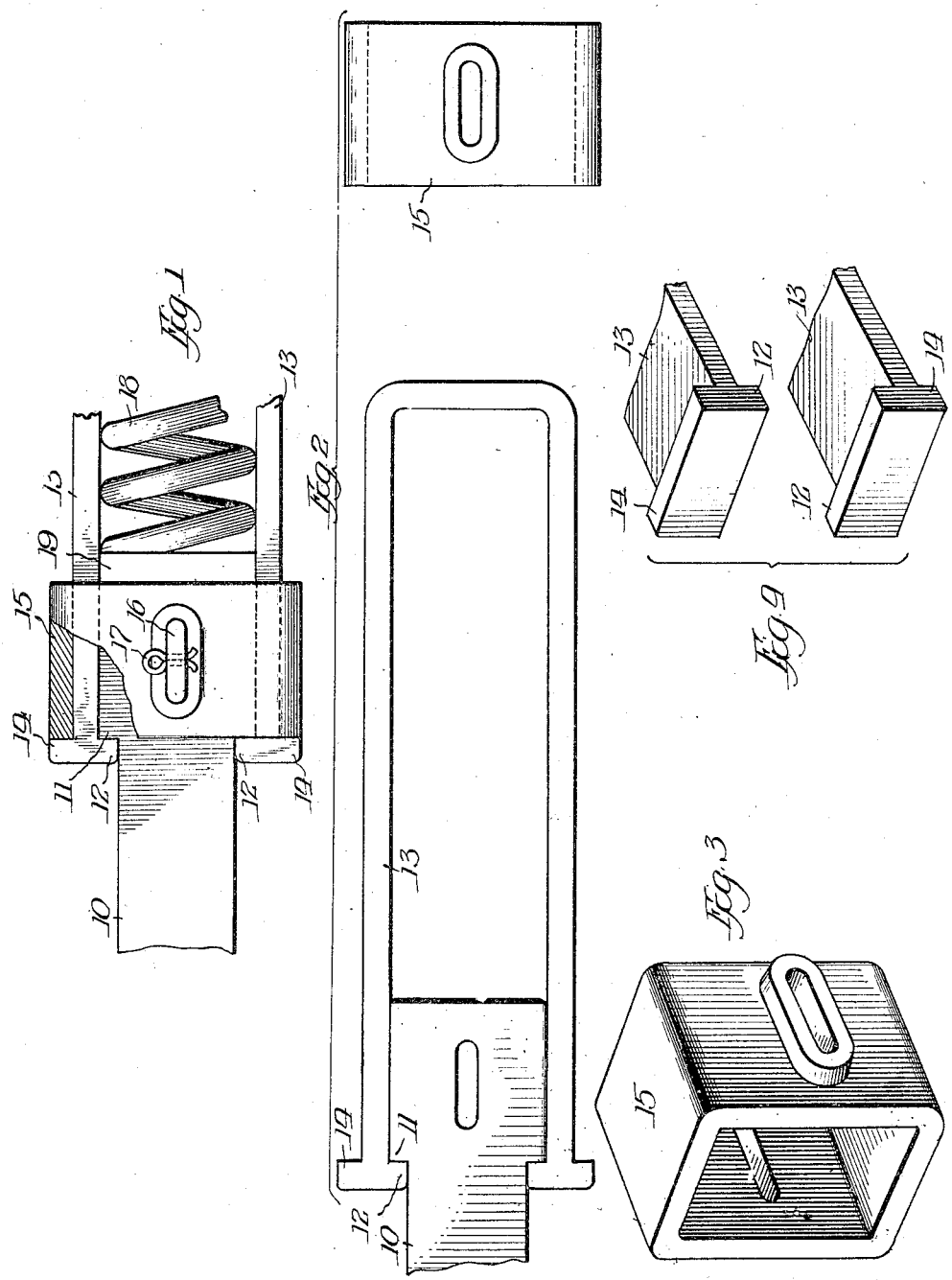

CHARLES F. MURRAY, OF EVANSTON, ILLINOIS, ASSIGNOR TO KEYOKE RAILWAY EQUIPMENT COMPANY, OF CHICAGO, ILLINOIS, A CORPORATION OF DELAWARE.

YOKE-FASTENER.

1,161,952. Specification of Letters Patent. Patented Nov. 30, 1915.

Original application filed February 29, 1912, Serial No. 680,665. Divided and this application filed June 9, 1913. Serial No. 772,539.

*To all whom it may concern:*

Be it known that I, CHARLES F. MURRAY, a citizen of the United States, and resident of Evanston, in the county of Cook and State of Illinois, have invented certain new and useful Improvements in Yoke-Fasteners, of which the following is a specification.

My invention relates to draft rigging and has particular reference to a novel connection between the draw-bar and yoke.

The subject matter of this application was first disclosed in my application Serial No. 680,665, filed Feb. 29, 1912.

It is well known that the connection between the draw-bar and the yoke is a point of weakness and many constructions have been devised whereby such connection may be strong and rigid and which construction shall eliminate the use of bolts or rivets. It is a common construction to rivet the yoke to the butt end of the draw-bar by means of two rivets. In practice, however, due to side strains, the rivets are very often sheared and the connection broken. One of the prolific causes of delays and accidents is the pulling out of the draw-bar due to a broken connection to the yoke.

It is the object of my present invention to eliminate the possibility of such contingencies and provide a connection which shall be simple, easily applied and removed, which shall eliminate the use of bolts and rivets and which shall absolutely prevent the breaking of the connection between the draw-bar and the yoke.

It is a further object to provide a connection so arranged that under buff the draw-bar may be forced rearward the yoke remaining unmoved. This is accomplished in my construction by means of the slip connection between the yoke, draw-bar and fastening head.

The invention will be more readily understood by reference to the accompanying drawings, wherein—

Figure 1 is a side elevation showing a draw-bar, yoke and fastening means arranged in accordance with my invention; Fig. 2 is a composite view showing the draw-bar and yoke assembled and with the fastening head ready to be slipped on; Fig. 3 is a perspective view of the fastening head, and Fig. 4 is a perspective view of the two ends of the yoke.

Referring more particularly to the drawings it will be seen that the draw-bar shank 10 is provided with shoulders 11, with which hooks 12, formed on the ends of the yoke 13, may coöperate. Also formed on the ends of the yoke are oppositely disposed hooks 14. The fastening head 15, is preferably in the form of a rectangular casting having an opening therethrough of a size slightly larger than the outside transverse dimensions of the yoke and arranged whereby the head may be slipped on over the yoke into the position shown in Fig. 1. In this position a key 16, is passed through registering apertures in the draw-bar and fastening head, which key is held in place by any suitable means such as the cotter 17.

One or more springs 18 are located within the yoke such springs abutting a front follower 19, as shown in Fig. 1. On normal pull, the front follower 19 being held against movement, the spring will be compressed. On the rearward movement the arrangement may be such if desired, that the draw-bar fastening head and follower 19 may be moved rearwardly, the yoke remaining unmoved. In this instance the yoke will slide through the connecting means to the head.

It is obvious that other modifications may be made in the construction shown and such modifications as are within the scope of my claim I consider within the spirit of my invention.

I claim:

In a device of the character described, a yoke strap and means for connecting said strap to a draw-bar, said means consisting of a hollow head connected to the draw-bar and slidably connected with the yoke strap by pull on the draw-bar.

CHARLES F. MURRAY.

Witnesses:
 T. D. BUTLER,
 GEO. C. DAVISON.